United States Patent [19]

Heinzl et al.

[11] 4,202,267
[45] May 13, 1980

[54] DEVICE FOR MONITORING THE INK SUPPLY IN INK-OPERATED PRINTERS

[75] Inventors: Joachim Heinzl; Hans Kern; Fritz Giebler, all of Munich, Fed. Rep. of Germany

[73] Assignee: Siemens Aktiengesellschaft, Berlin & Munich, Fed. Rep. of Germany

[21] Appl. No.: 789,743

[22] Filed: Apr. 21, 1977

[30] Foreign Application Priority Data

Apr. 23, 1976 [DE] Fed. Rep. of Germany ....... 2617730

[51] Int. Cl.² ...................... B41F 33/12; B41F 33/02; G01F 23/26
[52] U.S. Cl. ........................................ 101/364; 101/1; 346/140 R; 73/304 C
[58] Field of Search .................. 101/350, 364, 1, 366, 101/210, 207, 208; 73/304 C, 304 R; 346/75, 140 R, 140 A; 222/64, 66; 137/386, 392; 400/126; 307/118

[56] References Cited

U.S. PATENT DOCUMENTS

| | | | |
|---|---|---|---|
| 3,102,301 | 9/1963 | Dechene | 73/304 R |
| 3,299,436 | 1/1967 | Behmoras et al. | 346/140 |
| 3,520,445 | 7/1970 | Hansen | 73/304 C |
| 3,667,500 | 6/1972 | Stone | 101/364 X |
| 3,708,798 | 1/1973 | Hildenbrand et al. | 346/75 X |
| 3,901,079 | 8/1975 | Vogel | 73/304 C |
| 3,944,845 | 3/1976 | Luteran | 73/304 R |
| 4,001,676 | 1/1977 | Hile et al. | 73/304 C X |

FOREIGN PATENT DOCUMENTS 1266520 4/1968 Fed. Rep. of Germany ............ 346/140
1174395 12/1969 United Kingdom .................. 73/304 C

OTHER PUBLICATIONS

IBM Technical Disclosure Bulletin, vol. 16, No. 3, Aug. 1973, p. 775.
IBM Technical Disclosure Bulletin, vol. 16, No. 10, Mar. 1974, pp. 3293-3294.

Primary Examiner—J. Reed Fisher
Attorney, Agent, or Firm—Hill, Van Santen, Steadman, Chiara & Simpson

[57] ABSTRACT

A device for monitoring the supply of printing liquid in the reservoir of an ink-operated printer and the like, in which two monitoring electrodes are disposed in and wetted by the printing liquid, with circuit means being connected to the electrodes for monitoring the electrical resistance therebetween, which resistance varies in response to changes in the amount of ink in the reservoir. Means are provided, responsive to predetermined resistance values, for actuating at least one display element, and/or effecting disconnection of an associated printer. Additional circuit means may also be connected to the monitoring means for actuating a preliminary warning device prior to actual triggering of a display element indicating the exhaustion of the printing liquid supply. Means also may be provided for monitoring the supply of a data carrier, i.e. paper, which means may likewise be operatively connected to the display element, whereby the latter serves as a common display element to indicate both the operational status of the ink supply reservoir and the presence of a data carrier for receiving the printing.

15 Claims, 2 Drawing Figures ns in ink-operated printers

BACKGROUND OF THE INVENTION

The invention relates to a device for monitoring the supply of printing liquid in the reservoir of an ink-operated printer or similar type of equipment, in which two electrodes, wetted by the printing liquid are employed in the monitoring operation.

In ink-operated printers of the type here involved, generally a printing head is moved by a motor, or other suitable means, along a data carrier, with the head being supplied with the printing liquid or ink through a supply line from an ink supply reservoir. While the ink reservoir may be made an integral part of the printer head, which has heretofore been proposed, visual monitoring of the ink supply in the reseavoir cannot be efficiently achieved in such a structure. However, a continuous monitoring of the ink supply is of great importance, particularly when printers of this type are employed in teleprinter and data printer applications.

Devices for determining the ink lever in an open vessel are known. For example, see IBM Technical Disclosure Bulletin Volume 16, No. 3, August 1973, page 775, in which device two electrodes are immersed in the liquid and, through an appropriate circuit arrangement, the capacitance between the electrodes is measured, with such capacitance changing in accordance with the level of the printing liquid. However, the dimensions of the ink supply reservoir impose restrictions on the capacitance, and as a result, the absolute magnitude of the capacitance change is extremely small. Consequently, a device of this type is relatively susceptible to disturbance through external influences, and the accuracy of the measurement can fluctuate considerably.

BRIEF SUMMARY OF THE INVENTION

The invention therefore has among its objectives the provision, in ink-operated printers or similar printers utilizing a supply of printing liquid of a device which will monitor the printing liquid supply and which will operate in a simple and reliable manner, while at the same time, will be relatively inexpensive to manufacture.

This objective is realized, in accordance with the present invention, by the provision of a circuit arrangement which measures the electrical resistance between two electrodes disposed in the liquid supply, whereby the measured resistance will vary in accordance with the level of liquid ink in the supply reservoir, and which in the presence of predetermined specific resistance values is operable, through a suitable switching device, to actuate at least one display element and/or switch off the printing mechanism.

In a further embodiment of the invention, additional circuit means is provided for actuating a preliminary warning device, prior to the actual triggering of a display element indicating the exhaustion of the printing liquid supply.

Advantageously, the ink resistance between a hollow tube or needle, which may form the supply connection between the ink supply system and the ink supply reservoir, and a cooperable electrode, for example a rivet-like member disposed in the base of the ink supply reservoir, may be monitored by suitable measuring means, to readily determine therefrom the level of the printing liquid in the supply reservoir. When the supply of liquid in the reservoir is nearly exhausted, a flexible rubber bag, forming the container for the printing liquid may come in contact with the base of the enclosing vessel and thereby reduce the conductive cross-sectional area of liquid between the electrodes. Upon detection of a predetermined resistance value of the ink within the reservoir, cooperable switching means may trigger a warning device, which may be preceded by a preliminary warning, and, if desired, simultaneously shut down the printer.

Advantageously, measurement of the ink resistance is achieved with the use of an A.C. potential containing no D.C. component which could break down the ink and electrodes.

In addition, the device advantageously may be provided with a suitable delay element which will have the effect of suppressing parasitic pulses, thus rendering the entire device insensitive to disturbances and other influences. By inclusion of means for monitoring the presence or supply of a data carrier which is to receive the printing, such as paper stock, the display element may be utilized in common for indicating both the operating condition of the ink supply reservoir and the presence of a data carrier, whereby several functions of the printer may be simultaneously monitored. In such case, the display element thus may be utilized as a criterion for the readiness of the printer for operation.

DETAILED DESCRIPTION OF A PREFERRED EMBODIMENT OF THE INVENTION

Figure 1:
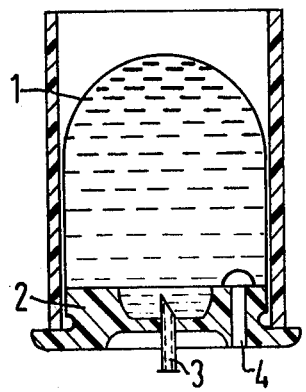
FIG. 1 is a transverse sectional view through an ink supply vessel forming the ink reservoir, constructed in accordance with the invention.

Referring to FIG. 1, an ink-operated printer (not illustrated), and provided with a head moving along a data carrier, is supplied with printing liquid through a supply line from an ink vessel which includes a flexible bag 1 of suitable material, such as rubber or the like, is adapted to be filled with and retain the printing liquid, with the bag being slipped over the vessel base 2, which likewise may be made of rubber or other suitable material. The vessel base, when assembled on a mounting device (not illustrated), is suitably penetrated by a hollow needle 3 whereby an airtight seal is formed between the needle and the base. The hollow needle 3 thus forms a part of the ink supply system, and the printing liquid may be transferred therethrough from the ink vessel to the printer head.

The base 2 is also provided with an additional electrode, illustrated as being in the form of a rivet-like member 4, and thus may, in combination with the needle 3, function as a counter-electrode by means of which the electrical resistance of the ink in the vessel, operatively disposed between the needle and the electrode 4, may be measured. As the ink is withdrawn from the reservoir, the rubber bag will move into closer relationship with the electrode 4, and effectively reducing the conductive ink cross-sectional area between the two electrodes, as a result of which the electrical resistance will change as a function of the level to which the rubber bag 1 is filled, whereby such resistance value may be employed as a criterion for the amount of printing liquid still retained within the reservoir. Predetermined resistance magnitudes thereof thus may be utilized to trigger a warning device associated with the ink-operated printer. Such warning device may employ visual or acoustical warning means, or a combination of both, to alert the operator that the ink supply in the reservoir has become exhausted. Preferably, the arrangement is such that a preliminary warning signal will be initially produced, prior to the actual complete exhaustion of the ink supply, with the main warning signal being subsequently actuated when the ink supply is, for operative purposes, exhausted, and, at the same time, the system may be operable to simultaneously shut down the ink operated printer.

Figure 2:
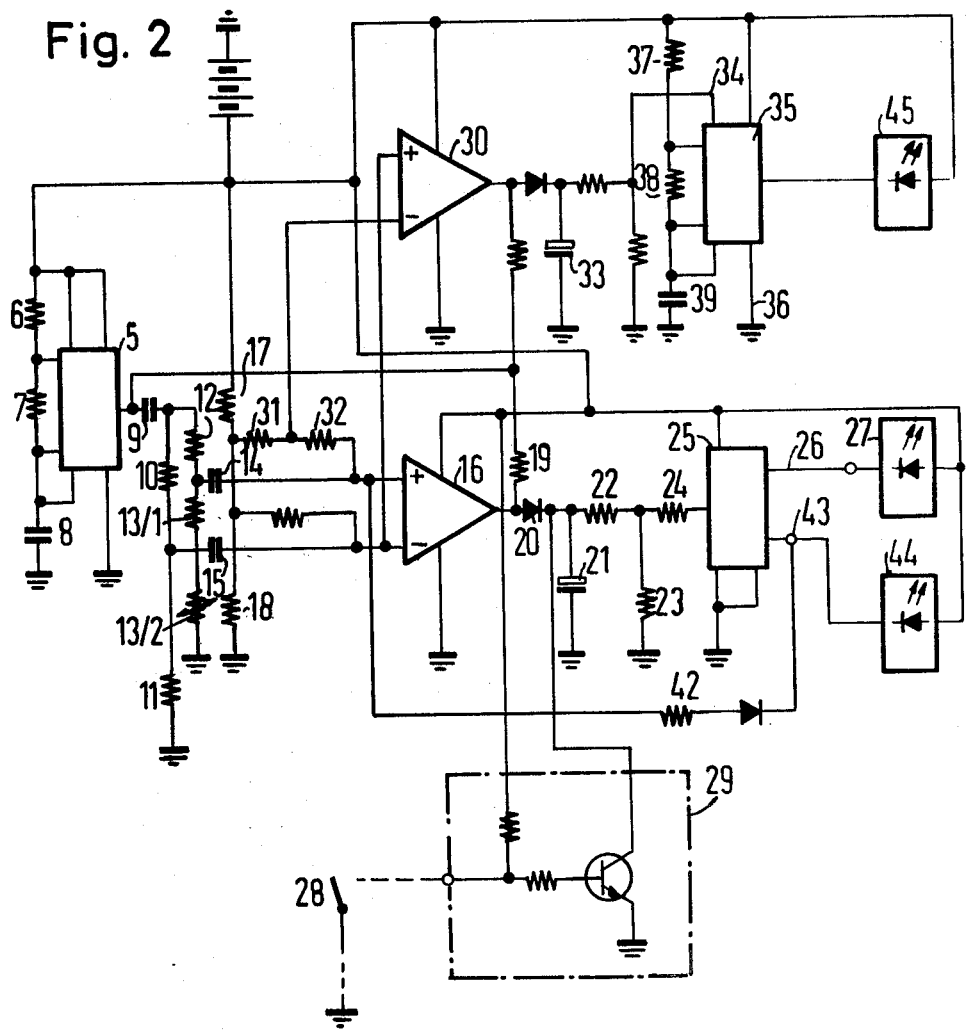
FIG. 2 is a schematic circuit diagram of a circuit arrangement in accordance with the invention.

FIG. 2 illustrates a preferred circuit arrangement for monitoring the ink supply in the reservoir, and includes a pulse generator 5 which is operable to provide square wave pulses having an amplitude of approximately 11 volts and a mark-space ratio of approximately 1:1, frequency of which is determined by resistors 6 and 7 and a capacitor 8. The square wave pulses of the pulse generator are converted to a symmetrical A.C. voltage of approximately 10 volts by means of a capacitor 9 connected to the output of the generator 5. The A.C. output thus contains no D.C. component of any kind which might produce a breakdown in the ink.

Such pure A.C. voltage is supplied to a measuring bridge comprising resistors 10, 12 13/1, 13/2 and the ink resistance 11 representing the resistance between the electrodes 3 and 4. Thus, the resistances 10, 11 form one bridge arm and the resistances 12, 13/1, 13/2 form the other bridge arm. The bridge diagonal between the junction of the resistor 10 and ink resistance 11, and junction of the resistor 12 with the resistors 13/1, 13/2 is coupled, through capacitors 14 and 15, with an operational amplifier 16, functioning as a differential A.C. voltage amplifier, whose inputs are biased to a voltage of approximately +6 volts, derived from a suitable potential source over a voltage divider comprising resistors 17 and 18.

In operation of the bridge, as long as a sufficient supply of ink remains in the reservoir, the ink resistance 11 is less than the resistances of the resistors 13/1 and 13/2. Preferably, the resistor 13/2 has a negative temperature coefficient which compensates for the temperature dependence of the ink resistance 11. The output voltage of the operational amplifier 12 is determined by the non-inverting input thereof, with the square wave pulses supplied by the pulse generator 5 being cophasal with the output voltage from the operational amplifier 16.

As soon as the ink resistance 11 exceeds the resistances of the resistors 13/1 and 13/2, the operational amplifier 16 is driven over its inverting input, as a result of which pulses appear at the output of the operational amplifier which are 180° out of phase with the square wave pulses obtained from the output of the pulse generator 5.

Consequently, by coupling the pulse generator 5 to the output of the operational amplifier 16, for example through a resistor 19, it is possible to effect, in a very simple fashion, a phase comparison. In operation, the output of the operational amplifier 16 thus will remain approximately at zero potential as long as the output voltage is oppositely phased with the voltage at the pulse generator 5. This output condition at the operational amplifier 16 will exist only when there is no longer a sufficient ink supply in the ink vessel. However, if the ink vessel still contains an adequate amount of ink, the output signals at the output of the operational amplifier 16 will be cophasal with those of the pulse generator 5.

In operation, if the ink-operated printer is ready for actuation, a capacitor 21 will be charged over a diode 20 to a voltage of approximately 10 volts, which voltage is supplied over a voltage divider comprising resistors 22, 23 and 24 to a threshold switch 25 whereby the latter is actuated. The output 26 thereof conducts at approximately zero volts and a following display element 27, indicated purely schematically, employing, for example a green luminescent diode is actuated with such actuation of the display element 27 indicating that the equipment is in readiness for operation. In the event an adequate supply of ink is no longer contained within the vessel, the display element 27 will be extinguished.

It will be appreciated that as the capacitor 21 is fully charged only when the printer is in condition for operation, the display element 27 not only indicates that the ink supply is exhausted, but also will be indicative of a defect in the monitoring circuit, for example failure of the pulse generator 5, as the capacitor will in such case not be charged to its normal operating condition.

The capacitor 21 and the associated resistors also function as a delay element which reliably protects against the possible influence of parasitic voltages, as such voltage will be buffered without creating a malfunctioning.

To enable the use of the display element 27 for simultaneous monitoring of the condition of the data carrier supply, a contact 28 may be provided which is suitably arranged to sense the end of the paper and thus is responsive to the exhaustion of the paper supply. Such contact may be connected over a suitable electronic switching device 29 to the capacitor 21. Consequently, when the end of the paper is reached, the contact 28 is opened whereby the switching device 29 is conductive resulting in discharge of the capacitor 21. Discharge of the capacitor will, in turn, result in a triggering of the threshold switch 25 in the same manner as its operation when the ink supply approaches exhaustion, with the display element 27, which normally indicates operational readiness, being extinguished.

In addition to the use of a display element 27 for indicating that everything is in readiness for operation, it is so possible to provide a red luminescent diode 44, illustrated as being connected to the inverted output 43 of the threshold switch 25, which will effect an actuation of the display element 44 and thus provide a positive warning in addition to the extinguishing of the element 27.

It is also particularly desirable to provide a forewarning to the operator whereby he will be put on notice of the approaching exhaustion of the ink supply, prior to the actual exhaustion thereof and shut down of the printer. Such an advanced warning is provided in the circuit of FIG. 2, operative to actuate a preliminary warning device 45, which likewise may be in the form of a luminescent diode.

The additional circuitry for actuating the preliminary display element 45 comprises an additional operational amplifier 30, also whereby it likewise is responsive to predetermined resistance change in the bridge, resulting from change in the variable ink resistance 11, and thus functioning in a manner similar to the amplifier 16. However, the amplifier 30 is connected to a reference voltage, derived from the voltage divider 31, 32, whereby the amplifier will be responsive to a lower ink resistance 11. The voltage divider 31, 32 is so designed that, under normal printer operation, this response will occur, timewise, approximately 15 minutes before the actual final disconnection is effected by means of the threshold switch 25. The preliminary warning circuit is similar in design to the actual circuit employed to trigger the main warning device, with the inputs of the operation amplifier 30, however, being reversed as to polarity. Consequently, the capacitor 33 carries no charge as long as adequate supply of ink is present, and the reset input 34 of an additional pulse generator 35 carries no current, whereby a logic "1" exists at its output 36 therefor. When the preliminary warning system is actuated, the capacitor 33 is charged and the pulse generator 35 triggered. The latter is operative to supply pulses with a mark-time period determined by resistors 37, 38 and capacitor 39, with such pulses being applied to the preliminary warning device 45, which in turn results, for example, in a flashing operation of a luminescent diode.

To prevent inadvertent reconnection and operation of the ink-operated printer, following actuation of the warning device, a lock-in circuit is provided within the monitoring circuit which, in the embodiment illustrated, comprises a resistor 42 which provides an operative connection between the output 43 of the threshold switch 25 and the non-inverting input of the operational amplifier 16. In the course of the monitoring operation, in the event the warning device 44 is actuated, the resistor 42 and series diode are operative to reduce the reference voltage applied to the non-inverting input of the operational amplifier 16, as determined by the resistor 42, with the parameters being such that the circuit cannot be reactivated, the ink operated printer thus can be put into operation only following correction of the condition that resulting in the shut-down, i.e. replenishment of the ink supply or of the data carrier.

Having thus described our invention it will be obvious that although various minor modifications might be suggested by those versed in the art, it should be understood that we wish to embody within the scope of the patent granted hereon all such modifications as reasonably, and properly come within the scope of our contribution to the art.

We claim as our invention:

1. A device for monitoring the supply of electrically conductive printing liquid of an associated ink-operated printer, comprising a reservoir having an outlet at the bottom thereof for printing liquid, two monitoring electrodes positioned at the bottom portion of said reservoir and disposed in and wetted by the printing liquid, one of said electrodes being disposed in the reservoir bottom in the vicinity of said outlet, the other of said electrodes being so disposed with respect to the first electrode that the gap therebetween, normally filled by printing liquid, extends generally laterally along the bottom of said reservoir, circuit means connected to said electrodes for monitoring the electrical resistance between said electrodes, which is responsive to changes in the amount of liquid in the reservoir, a display element, and means, responsive to a predetermined resistance value, cooperable with means for effecting disconnection of said associated ink-operated printer and actuation of said display element.

2. A device according to claim 1, comprising a preliminary warning device, and additional circuit means connected to said electrodes for actuating said preliminary warning device prior to actual triggering of said display element indicating the exhaustion of the printing liquid supply.

3. A device according to claim 2, wherein said one monitoring electrode comprises a hollow tubular member which forms the outlet of the liquid supply reservoir.

4. A device according to claim 1, wherein said circuit means includes means for supplying an A.C. potential for measurement of the resistance between said electrodes.

5. A device for monitoring the supply of electrically conductive printing liquid of an associated ink-operated printer, comprising a reservoir having an outlet at the bottom thereof for printing liquid, two monitoring electrodes positioned at the bottom portion of said reservoir and disposed in and wetted by the printing liquid, one of said electrodes being disposed in the vicinity of said outlet, the other of said electrodes being so disposed with respect to the first electrode that the gap therebetween, normally filled by printing liquid, extends generally laterally along the bottom of said reservoir, circuit means connected to said electrodes for monitoring the electrical resistance between said electrodes, which is responsive to changes in the amount of liquid in the reservoir, said circuit means comprising a measuring bridge for comparing the resistance, between the electrodes, with a threshold predetermined resistance value, resistance responsive means comprising a differential amplifier connected to and controlled by the measuring bridge, an A.C. generator for supplying an A.C. potential to said measuring bridge, a display element and a switching device connected to the output of said differential amplifier for effecting disconnection of such an associated inkoperated printer and actuation of said display element, said differential amplifier being operative, when the resistance between the electrodes reaches a value corresponding to the threshold resistance, to change the phase of the A.C. voltage appearing at the output of the differential amplifier for triggering said switching device.

6. A device according to claim 5, comprising in further combination, a delay element connecting said switching device to said amplifier for suppressing parasitic pulses.

7. A device according to claim 5, wherein said threshold resistance has a characteristic which compensates for the temperature dependence of the resistance between the electrodes.

8. A device according to claim 5, comprising in further combination, a second display element for providing a preliminary warning, and means connected to said monitoring means for actuating said lastmentioned display element responsive to a second predetermined resistance value between said electrodes which is less than said firstmentioned predetermined resistance value.

9. A device according to claim 8, wherein said means for actuating said second display element comprises a second differential amplifier having its inputs connected to said bridge in reverse to those of the first differential amplifier, wherein said second differential amplifier is operative when the resistance value between said electrodes is at said second predetermined resistance value, and a pulse generator connected between the output of said second differential amplifier and said second display element, for supplying the latter with actuating pulses to produce a flashing operation of said second display element.

10. A device according to claim 5, comprising in further combination, a second display element for providing a preliminary warning, and means connected to said monitoring means for actuating said lastmentioned display element responsive to a second predetermined resistance value between said electrodes which is less than said firstmentioned predetermined resistance value.

11. A device according to claim 10, wherein said means for actuating said second display element comprises a second differential amplifier having its inputs connected to said bridge in reverse to those of the first differential amplifier, wherein said second differential amplifier is operative when the resistance value between said electrodes is at said second predetermined resistance value, and a pulse generator connected between the output of said second differential amplifier and said second display element, for supplying the latter with actuating pulses to produce a flashing operation of said second display element.

12. A device according to claim 11, comprising in further combination, a delay element connecting said switching device to said second differential amplifier for suppressing parasitic pulses.

13. A device according to claim 12, wherein said threshold resistance has a characteristic which compensates for the temperature dependence of the resistance between the electrodes.

14. A device for monitoring the supply of electrically conductive printing liquid of an associated ink-operated printer, comprising a reservoir having an outlet at the bottom thereof for printing liquid, two monitoring electrodes positioned at the bottom portion of said reservoir and disposed in and wetted by the printing liquid, one of said electrodes comprising a hollow tubular member which forms the outlet of said reservoir, the other of said electrodes being so disposed with respect to the first electrode that the gap therebetween, normally filled by printing liquid, extends generally laterally along the bottom of said reservoir, the wetted surface of said other electrode having a convex configuration, circuit means connected to said electrodes for monitoring the electrical resistance between said electrodes, which is responsive to changes in the amount of liquid in the reservoir, a display element and means, responsive to a predetermined resistance value, cooperable with means for effecting disconnection of said associated ink-operated printer and actuation of said display element, and additional circuit means connected to said electrodes for actuation of a preliminary warning device prior to actual triggering of said display element indicating the exhaustion of the printing liquid supply.

15. A device for monitoring the supply of electrically conductive printing liquid of an associated ink-operated printer, comprising a reservoir the bottom of which is formed by a base member having a depression in the upper face thereof, two monitoring electrodes carried by said base member disposed in and wetted by the printing liquid, one of said electrodes comprising a hollow tubular member which is disposed in said depression, projecting upwardly therefrom, and forms the outlet of said liquid supply reservoir, the other of said electrodes projecting upwardly from the bottom of said base member adjoining said depression, the wetted surface of such other electrode having a convex configuration with the gap between such electrode and the first electrode extending generally laterally along the bottom of said reservoir, circuit means connected to said electrodes for monitoring the electrical resistance therebetween, which is responsive to changes in the amount of liquid in the reservoir, a display element, and means, responsive to a predetermined resistance value, cooperable with means for effecting disconnection of said associated ink-operated printer, and actuation of said display element.

* * * * *